(12) United States Patent
Salle et al.

(10) Patent No.: US 9,721,199 B2
(45) Date of Patent: Aug. 1, 2017

(54) SECURITY WRAP WITH TEARABLE SUBSTRATE

(71) Applicant: Johnson Electric S.A., Murten (CH)

(72) Inventors: Vincent Daniel Jean Salle, Hong Kong (CN); Martin Wallace Edmonds, Hong Kong (CN)

(73) Assignee: Johnson Electric S.A., Murten (CH)

( * ) Notice: Subject to any disclaimer, the term of this patent is extended or adjusted under 35 U.S.C. 154(b) by 308 days.

(21) Appl. No.: 14/223,242

(22) Filed: Mar. 24, 2014

(65) Prior Publication Data
US 2014/0306014 A1   Oct. 16, 2014

(30) Foreign Application Priority Data

Apr. 15, 2013 (GB) .................................. 1306799.6

(51) Int. Cl.
| G06K 19/02 | (2006.01) |
| H05K 1/02 | (2006.01) |
| G06F 21/86 | (2013.01) |
| G08B 13/24 | (2006.01) |
| H05K 1/03 | (2006.01) |

(52) U.S. Cl.
CPC ............. *G06K 19/02* (2013.01); *G06F 21/86* (2013.01); *H05K 1/0275* (2013.01); *G08B 13/2434* (2013.01); *H05K 1/0386* (2013.01); *H05K 2201/09063* (2013.01); *H05K 2201/09263* (2013.01); *H05K 2201/09445* (2013.01)

(58) Field of Classification Search
USPC ........................................................ 235/488
See application file for complete search history.

(56) References Cited

U.S. PATENT DOCUMENTS

| 5,761,054 | A | | 6/1998 | Kuhn | |
|---|---|---|---|---|---|
| 5,884,425 | A | * | 3/1999 | Baldwin | G09F 3/0292 283/101 |
| 5,936,525 | A | | 8/1999 | Leyden et al. | |
| 6,421,013 | B1 | | 7/2002 | Chung | |
| 8,455,990 | B2 | * | 6/2013 | Warren | H01L 23/576 257/678 |
| 2002/0084090 | A1 | | 7/2002 | Farquhar et al. | |
| 2002/0124392 | A1 | | 9/2002 | Chung | |
| 2006/0195705 | A1 | | 8/2006 | Ehrensvard et al. | |

(Continued)

FOREIGN PATENT DOCUMENTS

| EP | 0 417 447 A2 | 3/1991 |
|---|---|---|
| WO | WO 99/21142 A1 | 4/1999 |

(Continued)

*Primary Examiner* — Michael G Lee
*Assistant Examiner* — David Tardif
(74) *Attorney, Agent, or Firm* — Muncy, Geissler, Olds & Lowe, P.C.

(57) ABSTRACT

An electronic device is protected from unauthorized access by use of a security wrap having a security screen connected to an alarm circuit of the electronic device. The security screen has a pair of screen terminals interconnected by a conductor. The conductor is formed on a substrate. The substrate is arranged such that attempts to remove the security wrap will result in the substrate being torn and the conductor being damaged or broken whereby the resistance of the conductive path formed by the conductor changes to indicate an alarm condition.

12 Claims, 5 Drawing Sheets

(56) References Cited

U.S. PATENT DOCUMENTS

| | | | | |
|---|---|---|---|---|
| 2008/0106400 A1* | 5/2008 | Hunter | ............... | G06F 21/87 |
| | | | | 340/540 |
| 2008/0284610 A1 | 11/2008 | Hunter | | |
| 2009/0302111 A1* | 12/2009 | Woodard | ........... | G08B 13/2408 |
| | | | | 235/449 |
| 2011/0050426 A1* | 3/2011 | Choong | ........... | G06K 19/07749 |
| | | | | 340/572.1 |

FOREIGN PATENT DOCUMENTS

| WO | WO 2004/057519 A1 | 7/2004 |
|---|---|---|
| WO | WO 2009/042335 A1 | 4/2009 |

\* cited by examiner

SECURITY WRAP WITH TEARABLE SUBSTRATE

CROSS REFERENCE TO RELATED APPLICATIONS

This non-provisional patent application claims priority under 35 U.S.C. §119(a) from Patent Application No. GB 1306799.6 filed in The United Kingdom on Apr. 15, 2013.

FIELD OF THE INVENTION

This invention relates to a tamper indication device and in particular to a flexible security wrap for an electronic circuit used to detect invasive tampering.

Although this invention will be described in relation to security wraps as an example of the invention, the invention can be used with any printed electronics (PE) flex requiring a need for detection of removal or tampering.

BACKGROUND OF THE INVENTION

Currently, security wraps form a security screen masking an area of the electronics to be protected. Removal of the security wrap is physically difficult due to the manner in which the security wrap is attached to the device, usually by gluing, soldering or encapsulation by a resin material. However, they offer little in the way of tamper resistance or indication of tampering except by visual inspection. Some systems have an alarm circuit which may disable the device or simply give a visual indication that the security wrap has been removed, but there is no detection of an attempt to remove or bypass the security wrap by drilling a hole through it or simply lifting up a corner of the wrap.

In addition, coating with resins or encapsulating the security wrap creates a heavier and thicker construction whilst industry is striving to develop thinner and lighter devices to maximize internal space for more components to add greater functionality into portable electronic devices such as point of sale (PUS) terminals and other applications and/or to make the devices smaller and lighter.

Further, for some devices, such as credit card readers, there is a need to operate pre-assembled components of the device, for example curved metal discs known as metal domes for keypad buttons and so it is not feasible to encapsulate or coat the security wrap with resins. Resins create a hard shell that prevents the mechanical operation or tactile feedback of such components. The resin typically forms a permanent coating such that repair of the PCB or components is no longer possible.

Hence there is a desire for a security device that, in conjunction with an adhesive, summarily breaks or damages a conductive circuit, forming part of a security screen, thereby affecting an electrical state change to initiate an alarm, when removal is attempted.

SUMMARY OF THE INVENTION

This is achieved in the present invention by using a security wrap which has a security screen fixed to a substrate and bonded to a device to be protected, wherein the security screen is arranged to be damaged to raise an alarm signal when the device is tampered with.

Accordingly, in one aspect thereof, the present invention provides a security wrap for protecting an electronic component, comprising: a substrate; a security screen formed on the substrate, the security screen having an electrically conductive conductor forming a conductive path between a pair of screen terminals; and a layer of adhesive covering a side of the screen remote from the substrate, the adhesive being arranged to bond the security wrap to the parent device to be protected, wherein the substrate is formed from tearable material.

Preferably, the substrate has a plurality of weakened areas arranged to promote tearing of the substrate.

Preferably, the weakened areas promote tearing of the substrate across the conductor of the security screen to cut or modify the conductive path between the screen terminals.

Preferably, the weakened zones are slits formed in the substrate.

Preferably, the slits are formed along the edges of the substrate.

Preferably, the adhesive is a pressure sensitive adhesive.

Preferably, the adhesive is a thermoset adhesive.

Optionally, the substrate is paper.

Preferably, the conductor formed by conductive ink printed direction the substrate.

Preferably, the slits are arranged with respect to the conductor to cause severing of the conductor as the substrate is torn.

Preferably, the substrate, once applied to the parent device cannot be peeled off without being torn.

Preferably, the adhesive bonds the substrate to the parent device with less strength than the bond between the conductor and the substrate, whereby on tearing the substrate portions of the conductor bonded to the torn portion of the substrate remain bonded to the substrate to cut or change the electrical resistance of the conductive path between the screen terminals.

Preferably, the conductor is formed by conductive ink printed on the substrate.

Preferably, the security screen provides an area protected from invasive tampering which is substantially covered by a multitude of crossings of the conductor over the area without portions of the conductor forming the crossings coming into contact with each other.

Preferably, the conductor has a width and spacings between adjacent portions of the conductor forming the crossings have a width, both widths being between 1 and 1,000 microns, preferably between 200 and 300 microns.

Preferably, the security screen has multiple conductors forming conductive paths between respective pairs of screen terminals and the screen terminals are arranged to be connected to terminals of the alarm circuit.

Preferably, the or each conductor has a known predetermined resistance and the alarm circuit of the electronic device is sensitive to changes in the resistance of the conductor to sense an alarm situation.

Preferably, the security screen comprises a first security screen formed on the substrate and an additional security screen formed at least partially overlapping the first security screen and electrically insulated from the first security screen by a dielectric layer.

Preferably, multiple additional screens are formed at least partially overlapping the first security screen and electrically isolated from the first security screen and any intervening additional security screen by a dielectric layer.

Preferably, each security screen has a pair of screen terminals and the screen terminals are arranged to be connected to respective terminals of the alarm circuit.

Preferably, each security screen has a pair of screen terminals and at least some of the screen terminals are interconnected such that at least some of the security screens form a series connection between a pair of terminals of the alarm circuit.

According to another aspect, the present invention provides a point of sale device having an electronic circuit protected by a security wrap as described above.

Preferably, the parent device has an alarm circuit and the screen terminals are connected to the alarm circuit to initiate an alarm situation when the security screen is damaged.

Preferably, the alarm circuit is sensitive to changes in the resistance of the conductive path between the screen terminals.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
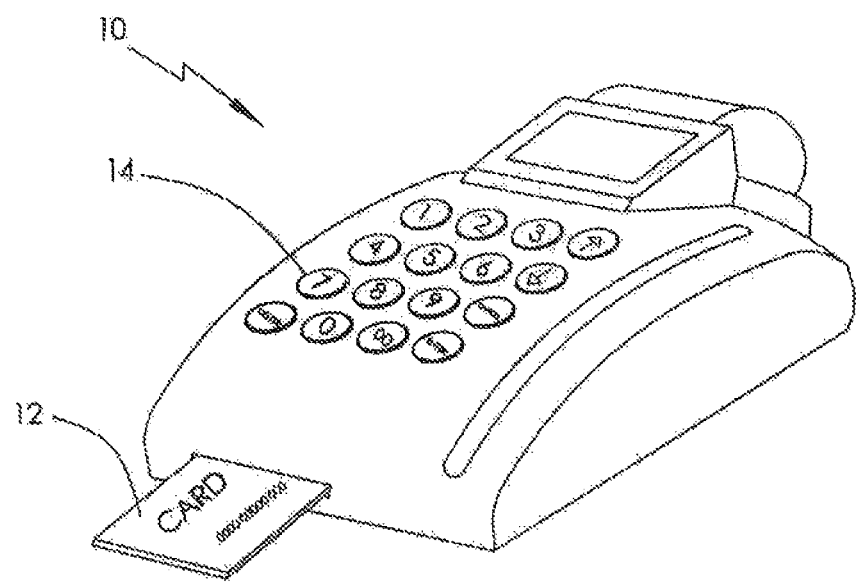
FIG. 1 illustrates a point of sale (POS) device as an example of a device which uses a security wrap.

FIG. 1 illustrates a POS device 10 as an example of where the security wrap is used. The POS has a slot for receiving a card 12, such as a credit card containing confidential information such as account details, etc. The device also has buttons 14 for entering details and instructions for controlling the device. Inside the POS is an electronic circuit comprising circuit board with a memory chip and/or a microprocessor (MCU) which may contain or momentarily access confidential information. The security wrap 20 may be placed over the entire circuit board or over just a portion of the board, as will be described herein after, depending on system requirements.

Figure 2:
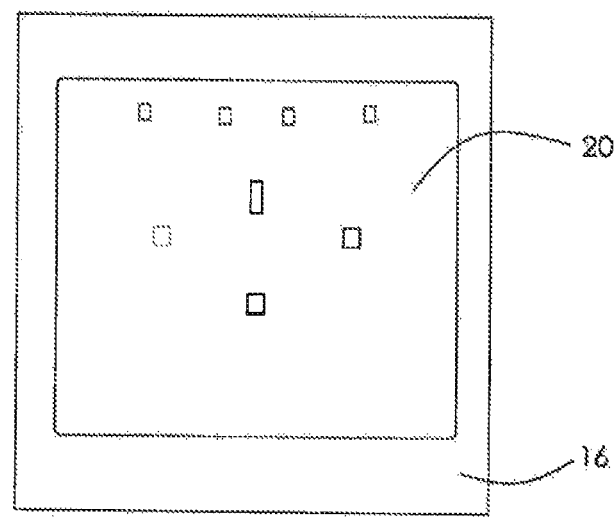
FIG. 2 illustrates the security wrap fitted to a PCB of the device of FIG. 1.
Figure 3:
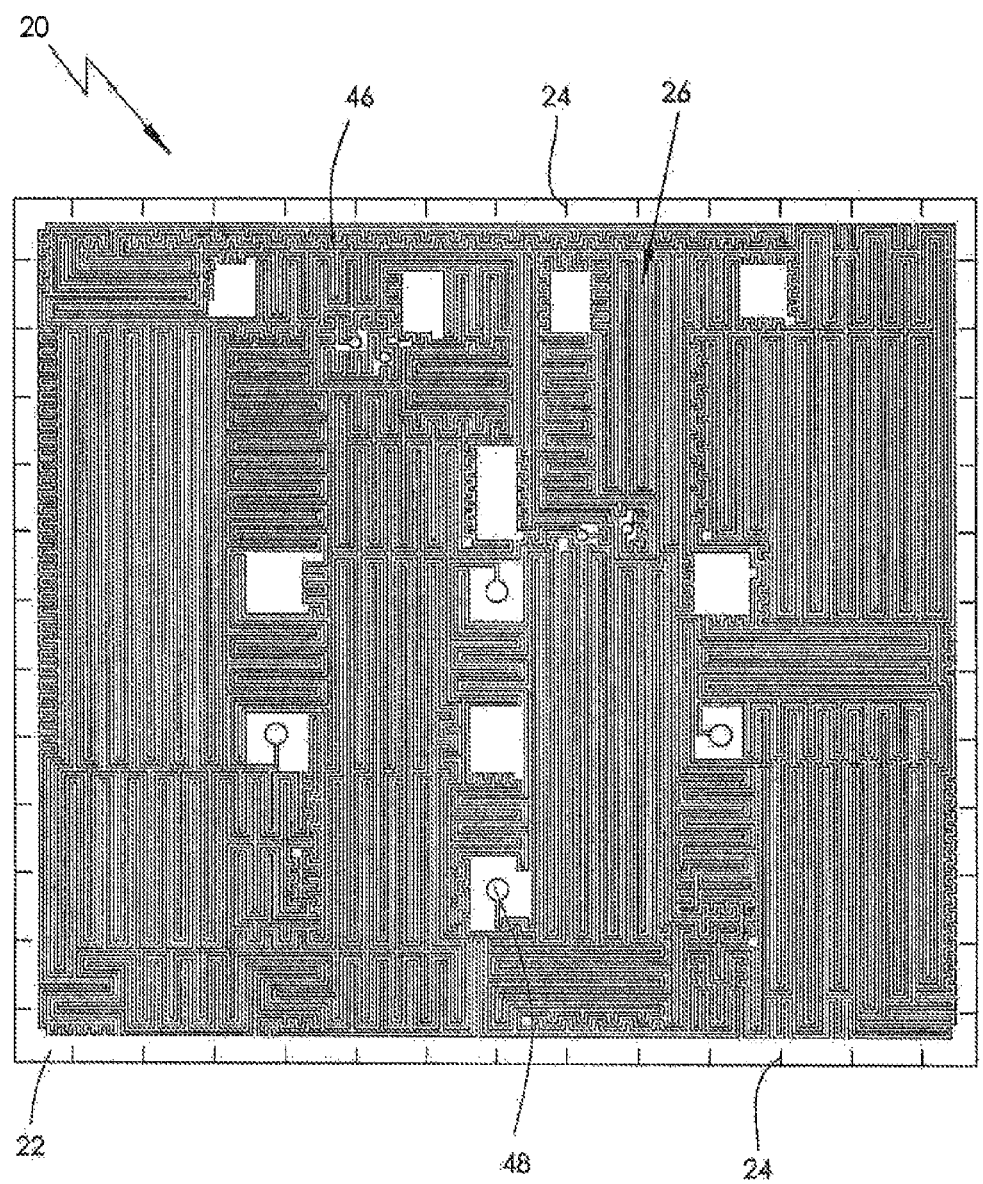
FIG. 3 is a view of the security wrap of FIG. 2, ready to be fitted to a parent device, such as the PCB of FIG. 2.

FIG. 2 shows the security wrap 20 as an open face version covering a large portion of the PCB 16 of the POS device. The PCB forms the parent device 16 to be protected and the security wrap is bonded to the PCB. The reverse side of the security wrap 20 is shown in FIG. 3 which illustrates the complete security wrap of FIG. 2 ready to be assembled to a parent device. The conductors or conductive traces 46 and screen terminals 48 of the security screen are visible due to the use of a transparent adhesive layer.

As shown in FIG. 3, the substrate 22 has a plurality of zones of weakness or tear initiating zones 24 in the form of slits cut into the edge of the substrate. The slits promote the tearing of the substrate. Therefore, the substrate, which by itself can be relatively fragile, is held together by the adhesive and the parent device. The zones of weakness are arranged to cause the substrate to tear across traces of the security screen during attempts to remove or peel back the substrate from the parent device.

Figure 4:
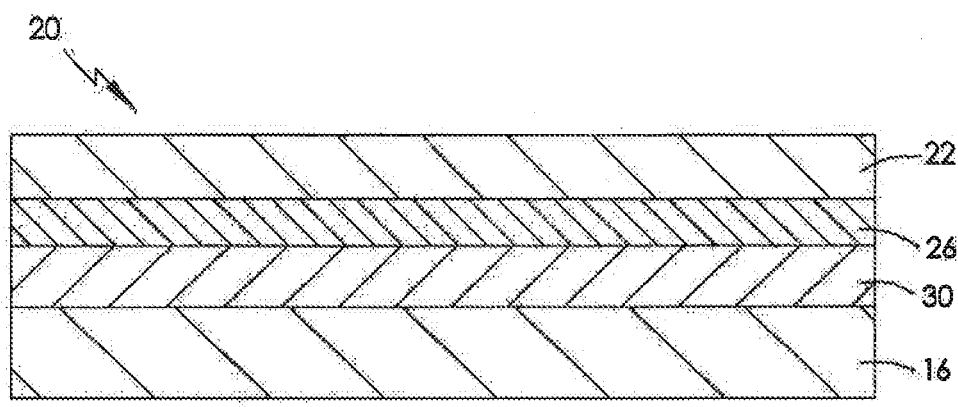
FIG. 4 is a is a sectional view of security wrap according to a first preferred embodiment, assembled to a parent device.

FIG. 4 is a sectional view of a portion of a security wrap 20 according to the first preferred embodiment of the present invention. This embodiment is a single conductive layer construction of either an open or full face security wrap shown assembled to a parent device 16.

The main components of the security wrap 20 are a substrate 22, a conductive layer known as a security screen 26, and an adhesive layer 30. An optional dielectric layer (not shown) may be used between the security screen and the adhesive layer to electrically isolate the security screen, or parts thereof, if needed.

The substrate 20 is a tearable material such as paper or a polymer film, typically a polyethylene terephthalate (PET or commonly referred to as polyester) film, that provides a base for a security wrap flexible circuit. Preferably, the substrate is flexible, being a film of thickness between 25 µm and 175 µm but can be greater depending on functional requirements and may include other variants of polymer film including, but not limited to, polycarbonate, PEN, polyimide, PVC. The substrate may be clear or opaque and pigmented, for example black or white.

In the preferred embodiments, the security screen 26 is a pattern of one or more conductive traces or conductors 46 formed by thermoset or thermoplastic conductive ink printed over the substrate 22 in variable trace widths and serpentine mesh patterns forming an electrically conductive path between a pair of screen terminals 48. A single layer security screen may have one, two or more conductors interconnecting respective pairs of screen terminals. A thermoset conductive ink is preferred for applications requiring a stable resistance between the screen terminals.

The conductive ink may be silver, carbon (or a combination of both), clear conductive polymer or other conductive or resistive inks, each with specific properties that suit the necessary requirement for the operation and functionality of the security wrap circuit. Multiple layers can be printed in total isolation or connected at specific points depending on the intended functionality of the security wrap flexible circuit.

In this invention, it is preferred to use a thermoset conductor to achieve the stable circuit resistance. Thermoset conductors include cross-linked conductive epoxy, conductive composites and conductive polymers. Thermoset conductors typically are composed of particulate electrically conductive material such as silver, copper, carbon, silver-coated copper, silver-coated aluminum, coated mica, glass spheres or mixtures thereof. With these thermoset materials, the formed security wrap is resistant to solvent attack and thermal tampering.

When a dielectric layer is used as a separating medium to permit multiple layers of conductive ink or multiple security screens to be printed on a single substrate, it is preferred that the dielectric layer is a UV curable ink system with electrically insulative properties. For example, the dielectric layer may be printed directly over a first security screen to insulate the first security screen from a second security screen or from other conductive circuit components, either of the security wrap or the parent device. Depending on security wrap functionality, the dielectric layer may be printed partially or fully over the top of a conductive trace pattern of a security screen to enable a subsequent conductive layer to be printed but remain electrically isolated from the first. A number of conductive/dielectric layers can be printed in succession. The dielectric layer is not necessary in a security wrap having a single conductive layer, such as the first embodiment of FIG. 4.

The adhesive layer 30 is preferably a pressure-sensitive adhesive (PSA), typically an acrylic adhesive that forms a bond between surfaces when pressure is applied. The adhesive layer is used to bond the security wrap to the parent device. Alternatively, the adhesive maybe a liquid adhesive such as an epoxy, or moisture-cure urethane etc. is dispensed or printed between security circuit and PCB, which is then cured by moisture, thermal or UV energy and forms a permanent bond between circuit and PCB. This type of adhesive is not pressure sensitive, but could work under the same disclosed principle.

Depending on the material of the parent device to which the security wrap is adhered a variant PSA with specific adhesion properties can be used. This can be a bespoke PSA specifically developed for a specific bonding requirement. Specifically the adhesion to the parent device 16 must be stronger than the force required to tear the substrate 22, so that on an attempt to separate the security wrap from the parent device, the adhesive layer will remain adhered to the parent device to promote tearing of the substrate, to sever the conductor 46 of the security screen.

Thus the security wrap 20 has a substrate 22 on which a security screen 26 is bonded or otherwise fixed. The security screen 26 comprises at least one conductive trace 46 forming a conductive path between a pair of screen terminals 48 arrange to be connected to an alarm circuit of the parent device. An adhesive layer bonds the substrate to the parent device. On attempt to remove the security wrap, the substrate tears, and part of the substrate remains adhered to the substrate, resulting in irreversible damage to the conductive trace which open circuits the trace or at least significantly modifies the resistance between the corresponding pair of screen terminals. Thus creating an electrical state change in the conductor, which may be a complete open circuit or a resistive change that can be detected by the alarm circuit of the parent device and in turn initializing an alarm response which may include the deletion of secure or personal data as necessary.

Figure 5:
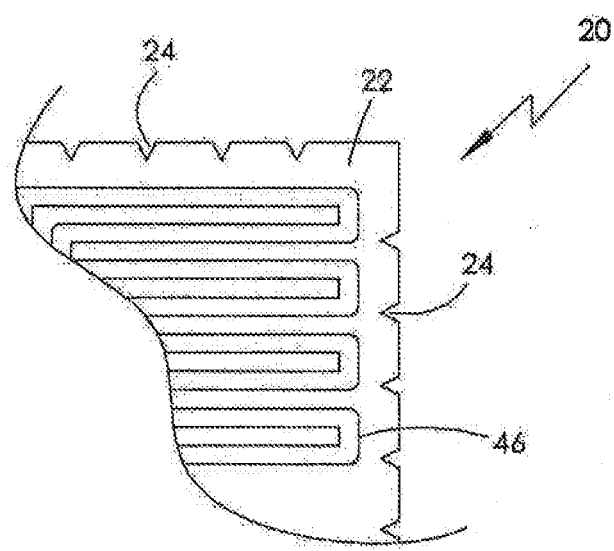
FIG. 5 is an enlarged view of a portion of the security wrap of FIG. 2 showing tear initiating zones in the form of notches.

The zones of weakness or tear initiating zones 24 may take forms other than slits in the substrate. As an alternative, notches, such as the V-shaped notches of FIG. 5 may be used. In FIG. 5, which is an enlarged view of a corner of a security wrap 20, tear initiating zones 24, are formed by notches cut into the edges of the substrate 22. The notches are arranged to promote tear of the substrate across the conductors 46.

Figure 6:
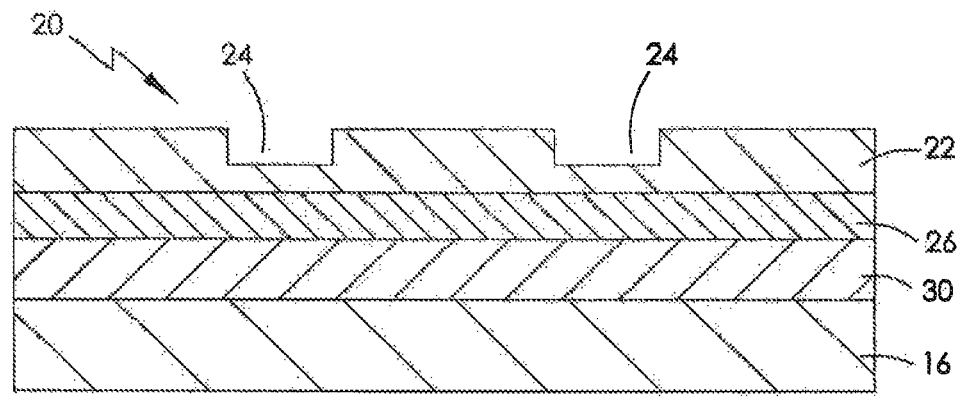
FIG. 6 is an enlarged view of a portion of a security wrap according to another embodiment showing tear initiating zones in the form of grooves.

FIG. 6 shows a further alternative embodiment of the zones of weakness 24. FIG. 6 is a view similar to FIG. 4. The substrate 22 has a number of grooves forming lines of reduced thickness which cross over the security screen 26. The substrate is easier to be torn along the lines of reduced thickness thus producing zones of weakness promoting the tearing of the substrate across the conductors of the security screen. Thus attempts to remove or peel back the substrate will result in tears promulgating along one or more grooves, severing or cutting the conductive path of the security screen.

Figure 7:
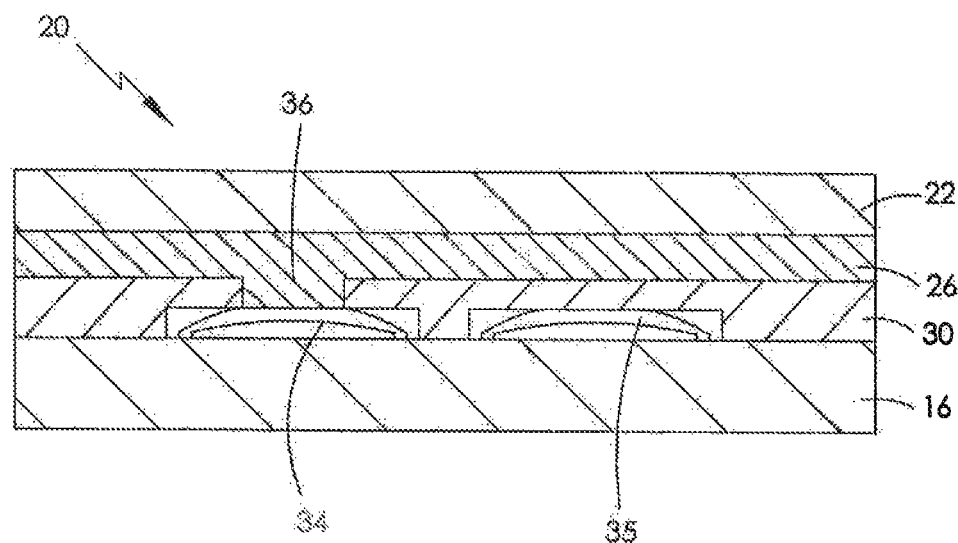
FIG. 7 is a sectional view of a security wrap similar to FIG. 4 showing use of a metal tactile dome as a connection element.

FIG. 7 is a sectional view showing main components in a single conductive layer construction of a single surface security wrap utilizing a metal dome as a conductive element to connect security wrap traces to a device and where the parent surface is for example a rigid or flexible PCB. The construction of the layers is the same as described for the security wrap of FIG. 4. However, the conductive layer is formed with an extension 36 which forms a screen terminal 48. The adhesive layer 30 does not cover the extension and a larger void is formed below the extension to accommodate a curved metal disc known as a dome 34. The dome 34 connects the screen terminal 48 to the parent device, in particular, to an alarm terminal. A further void is shown accommodating a second dome 35 which is insulated for the conductive layer by the adhesive layer 30. Dome 35 is an example of how the security wrap can be applied over switches. Dome 35 is an ancillary conductive element used to close a two pole switch on the surface of the parent device which is operated by applying external downward pressure on the security wrap directly above the dome 35.

Alternatives to a metal dome for connecting the security screen to the alarm circuit include using a plug of conductive material, such as a conductive pad or conductive adhesive. A conductive pad may be a carbon pad or simply a buildup of conductive material by printing layers of a conductive ink. Conductive adhesives include anisotropic (ACA) or isotropic (ICA) conductive adhesives, dependent on connection design, in resin or film form. Connection is established by means of polymerization of the adhesive or pressure applied from a protrusion of a device enclosure.

Figure 8:
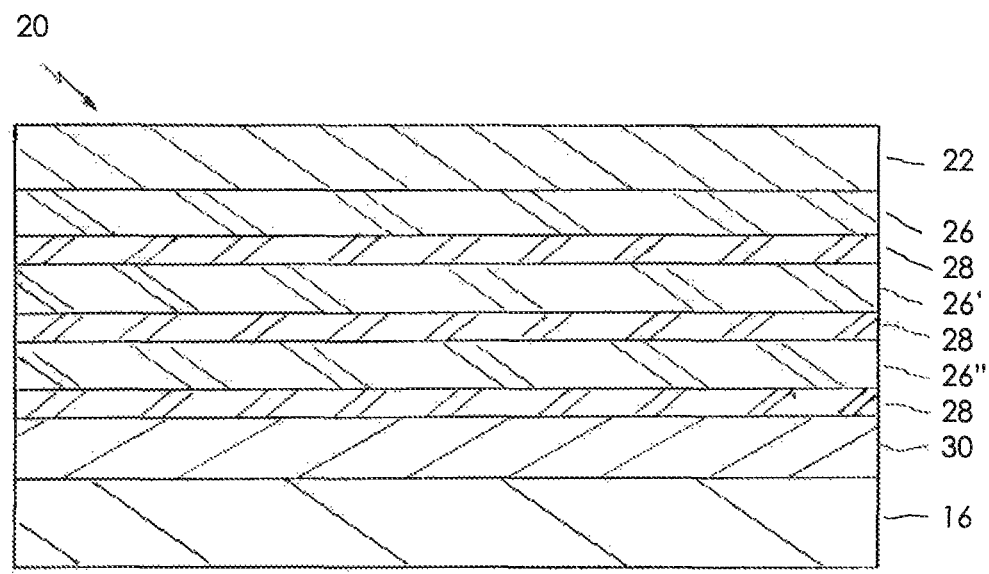
FIG. 8 is a sectional view, similar to FIG. 4, of a security wrap having multiple security screens.

FIG. 8 is a view similar to FIG. 4 of another embodiment which has multiple security screens. The use of multiple security screens which are formed, at least partially overlapping some or all of each other, significantly increases the security level against penetration. The security wrap 20 has a substrate 22. A first security screen 26 is formed on the substrate, preferably in a manner as described herein before. A dielectric layer 28 is formed over the first security screen, leaving the screen terminals exposed for later connection. A second security screen 26' is formed on the substrate, at least partially overlapping the first security screen 26 and electrically isolated there from by the dielectric layer. A second dielectric layer 28 is formed over the second security screen 26' and a third security screen 26" is formed on the substrate 22, at least partially overlapping the second security screen 26' and isolated from the first and second security screens by the dielectric layers 28. This process can be repeated any number of times until the desired number of security screen layers have been formed on the substrate. Thus the security wrap may have one, two, three or more security screens connectable to the alarm circuit of the parent device. FIG. 8 also illustrates the use of an optional further dielectric layer 28 between the last security screen and the adhesive layer 30 holding the security wrap to the parent device 16.

Figure 9:
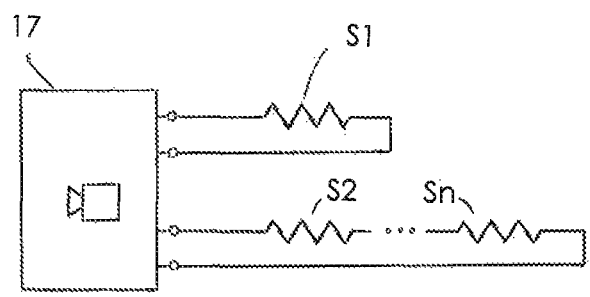
FIG. 9 is a schematic diagram showing a preferred connection of multiple security screens to an alarm circuit.

Connection of the security screens of the multilayer security wrap may be configured as desired. FIG. 9 is a schematic diagram of a combination arrangement to illustrate the preferred arrangements. By placement of the dielectric layers and the screen terminals, the screen terminals of different security screens can be connected together at the time the security screens are being formed or printed on the substrate. Alternatively they can be interconnected via the parent device or remain independent. In FIG. 9, security screen S1 is shown being independently connected to two terminals of an alarm circuit 17 of the parent device, while security screens S2 to Sn are illustrating a series connection with a second pair of terminals of the alarm circuit. By connection the security screens in series a simple alarm circuit can be used. By using each security screen as a separate alarm trigger, the alarm circuit may be more complicated but more information can be obtained about the location of the alarm trigger and the alarm circuit may effect different alarm responses. For example, minor peripheral tearing may initial a maintenance alarm condition whereas interruption of a centrally located security screen may cause an immediate disabling of the parent device. While the combination circuit arrangement of FIG. 9 is seen as the preferred combination, arrangements with the security screens only being connected to individual alarm terminals or all security screens being connected in series between one pair of alarm terminals, is possible.

It should be noted that in the sectional views of FIGS. 4, 6, 7 & 8, the sections are cut along a conductor of the security screen for convenience. It will be understood that the areas of the conductive layer or security screen where there is no trace, will be filled with material of the overlaying layer, i.e. either dielectric material or adhesive material, both of which are electrically insulative.

While the drawings have been enlarged for better clarity of observation and description, in the preferred embodiments, the width of the conductive traces and the spaces there between are in the range of 1 to 1,000 microns. The preferred embodiment uses a trace width between 200 and 300 microns. This produces a good compromise between costs and security level as the finer the widths the higher the security level but the more expensive the printing process.

The preferred construction of the security wrap is as follows. The substrate is formed with a number of zones of weakness, such as by cutting slits in the edge of the substrate and/or perforations and/or one or more areas of reduces thickness. The conductive trace forming the conductor 46 of the security screen 26 are attached to the substrate 22 via a screen printing method. The adhesive layer 30 is attached to the substrate over the conductor by applied pressure.

The security wrap is attached to a parent device in need of protection by the adhesive 30 using applied pressure. If removal of the security wrap is attempted the substrate will tear due to the zones of weakness promoting tearing of the substrate. Tearing of the substrate causes the conductive trace 46 to be damaged, thus creating a resistance change or complete open circuit. This changes the electrical state of the conductive trace and prompts the alarm system of the parent device to initiate an alarm condition.

Once the security wrap is bonded to a parent device 16 by the adhesive layer an attempt to remove or peel back the security wrap from the parent device results in the substrate being torn at least at one of the zones of weakness, cutting the conductor.

This creates an electrical state change in the conductor, this may be a complete open circuit or a resistive change, that can be detected by the device incorporating the security wrap and in turn initial an alarm response.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A point of sale device, comprising:
   a circuit board;
   an alarm circuit disposed on the circuit board;
   a security wrap interposed between the circuit board and a key pad and comprising:
      a substrate formed from tearable material and having a plurality of tear initiating zones;
      a security screen formed on the substrate, the security screen having an electrically conductive conductor forming a conductive path between a pair of screen terminals, the screen terminals being arranged to be connected to the alarm circuit of a parent device; and
      a layer of adhesive covering a side of the screen remote from the substrate, the adhesive being arranged to bond the security wrap to the parent device and having at least one void facing to the circuit board; and
   at least one first dome accommodated in the corresponding void and being capable of resilient deformation to electrically connect the circuit board;
   wherein the conductive conductor of the security screen forms an extension part electrically connecting the at least one first dome.

2. The point of sale device of claim 1, wherein the plurality of tear initiating zones are slits formed in the substrate.

3. The point of sale device of claim 2, wherein the slits are formed along edges of the substrate.

4. The point of sale device of claim 2, wherein the slits are arranged with respect to the conductor to cause severing of the conductor as the substrate is torn.

5. The point of sale device of claim 1, wherein the substrate is paper.

6. The point of sale device of claim 1, wherein the conductor has a known predetermined resistance and the alarm circuit of the parent device is sensitive to changes in the resistance of the conductor to sense an alarm situation.

7. The point of sale device of claim 1, wherein the security screen provides an area protected from invasive tampering which is substantially covered by a multitude of crossings of the conductor over the area without portions of the conductor forming the crossings coming into contact with each other, and wherein the conductor has a width and spacings between adjacent portions of the conductor forming the crossings have a width, both widths being between 1 and 1,000 microns, preferably between 200 and 300 microns.

8. The point of sale device of claim 1, wherein the security screen comprises a first security screen formed on the substrate and at least one additional security screen formed at least partially overlapping the first security screen and electrically insulated from the first security screen by a dielectric layer.

9. The point of sale device claim 8, wherein each security screen has a pair of screen terminals and at least some of the screen terminals are interconnected such that at least some of the security screens form a series connection between a pair of terminals of the alarm circuit.

10. The point of sale device of claim 1, wherein the plurality of tear initiating zones are V-shaped notches formed along edges of the substrate.

11. The point of sale device of claim 1, wherein the plurality of tear initiating zones are a number of grooves forming lines of reduced thickness of the substrate.

12. The point of sale device of claim 1, further comprising a second dome accommodated in the corresponding void and being insulated to the conductive conductor of the security screen by the layer of adhesive.

* * * * *